(12) United States Patent
Larson

(10) Patent No.: US 7,631,380 B1
(45) Date of Patent: *Dec. 15, 2009

(54) WHEELED ATTACHMENT SYSTEM

(76) Inventor: Donald O. Larson, Box 223, Audubon, MN (US) 56511

( * ) Notice: Subject to any disclaimer, the term of this patent is extended or adjusted under 35 U.S.C. 154(b) by 0 days.

This patent is subject to a terminal disclaimer.

(21) Appl. No.: 12/327,420

(22) Filed: Dec. 3, 2008

Related U.S. Application Data

(63) Continuation-in-part of application No. 12/120,640, filed on May 14, 2008, now Pat. No. 7,516,503, which is a continuation-in-part of application No. 11/852,793, filed on Sep. 10, 2007, now Pat. No. 7,516,502.

(51) Int. Cl.
A61G 1/02 (2006.01)
A61G 1/04 (2006.01)
B62B 1/00 (2006.01)

(52) U.S. Cl. .................. 5/626; 280/5.26; 280/47.131; 280/79.7

(58) Field of Classification Search .............. 5/625–627, 5/658, 620, 503.1, 624, 648; 296/20; 280/5.26, 280/47.131, 47.331, 79.3, 79.11, 79.7
See application file for complete search history.

(56) References Cited

U.S. PATENT DOCUMENTS

| | | | |
|---|---|---|---|
| 3,337,171 A * | 8/1967 | Canning | 248/165 |
| 4,264,082 A | 4/1981 | Fouchey, Jr. | |
| 4,327,933 A | 5/1982 | Tuggle | |
| 4,369,982 A | 1/1983 | Hein et al. | |
| 5,179,746 A | 1/1993 | Rogers | |
| 5,868,403 A | 2/1999 | Culp et al. | |
| 5,871,220 A | 2/1999 | Lombard | |
| 5,934,282 A | 8/1999 | Young, III et al. | |
| 6,357,063 B1 * | 3/2002 | Selby | 5/81.1 R |
| 6,698,811 B1 * | 3/2004 | Schuchman | 296/20 |
| 6,845,533 B1 | 1/2005 | Tulette | |
| 7,032,910 B2 | 4/2006 | Joie et al. | |
| 7,124,454 B2 | 10/2006 | Walkingshaw | |
| 7,296,816 B2 | 11/2007 | Wilnau | |

* cited by examiner

*Primary Examiner*—Alexander Grosz

(57) ABSTRACT

A wheeled attachment system for efficiently attaching to a spine board to allow the spine board to be easily maneuvered over various surfaces (e.g. flat surfaces, stairs, etc.). The wheeled attachment system generally includes a front support, a pair of wheel assemblies extending from opposing sides of the front support, a pair of side supports extending from the front support adjacent the pair of wheel assemblies and at least one strap extending from the pair of side supports. The side supports and the front support define a cavity adapted to receive an end of a spine board, wherein the strap is adapted to secure the pair of wheel assemblies about the spine board. A pair of extension members interconnect the pair of wheel assemblies with the front support so that a center rotational axis of the pair of wheel assemblies is vertically offset with the front support.

20 Claims, 18 Drawing Sheets

WHEELED ATTACHMENT SYSTEM

CROSS REFERENCE TO RELATED APPLICATIONS

I hereby claim benefit under Title 35, United States Code, Section 120 of U.S. Pat. No. 7,516,503 filed May 14, 2008 which claims benefit of U.S. Pat. No. 7,516,502 filed Sep. 10, 2007. This application is a continuation in-part of the Ser. No. 12/120,640 application now U.S. Pat. No. 7,516,503 which is a continuation in-part of the Ser. No. 11/852,793 application now U.S. Pat. No. 7,516,502. The U.S. Pat. Nos. 7,516,503 and 7,516,502 are hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to spine boards and more specifically it relates to a wheeled attachment system for efficiently attaching to a spine board to allow the spine board to be easily maneuvered over various surfaces (e.g. flat surfaces, stairs, etc.).

2. Description of the Related Art

Any discussion of the related art throughout the specification should in no way be considered as an admission that such related art is widely known or forms part of common general knowledge in the field.

Spine boards have been in use for years within various fields (e.g. medical, etc.). Spine boards are typically utilized for the immobilization and transportation of patients with suspected neck or spinal injuries. Spine boards are also typically comprised of a hard material, such as wood or plastic to prevent the board from bending while utilizing the present invention.

It is generally necessary when utilizing spine boards for at least two people to carry the board and patient upon the board. When carrying the patient and spine board in hard to maneuver places, such as stairs, one person generally has to walk backward while carrying their end of the board. This can be hazardous for the patient along with the individual carrying the board.

Attempts have been made to attach wheels to an end of the board; however while the wheels may provide easy transportation among flat surfaces they generally are not efficiently maneuverable among stairs. Because of the inherent problems with the related art, there is a need for a new and improved wheeled attachment system for efficiently attaching to a spine board to allow the spine board to be easily maneuvered over various surfaces (e.g. flat surfaces, stairs, etc.).

BRIEF SUMMARY OF THE INVENTION

The general purpose of the present invention is to provide a wheeled attachment system that has many of the advantages of the spine boards mentioned heretofore. The invention generally relates to a spine board which includes a front support, a pair of wheel assemblies extending from opposing sides of the front support, a pair of side supports extending from the front support adjacent the pair of wheel assemblies and at least one strap extending from the pair of side supports. The side supports and the front support define a cavity adapted to receive an end of a spine board, wherein the strap is adapted to secure the pair of wheel assemblies about the spine board.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a wheeled attachment system for efficiently attaching to a spine board to allow the spine board to be easily maneuvered over various surfaces (e.g. flat surfaces, stairs, etc.).

Another object is to provide a wheeled attachment system that attaches on various configurations and sizes of spine boards.

A further object is to provide a wheeled attachment system that includes a tri-wheeled structure to allow the attached spine board to be smoothly maneuvered down or up a flight of stairs.

A further object is to provide a wheeled attachment system that may easily attach and detach from a spine board via a strap.

A further object is to provide a wheeled attachment system that elevates the board to a proper clearance so as to accommodate for various height stairs.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
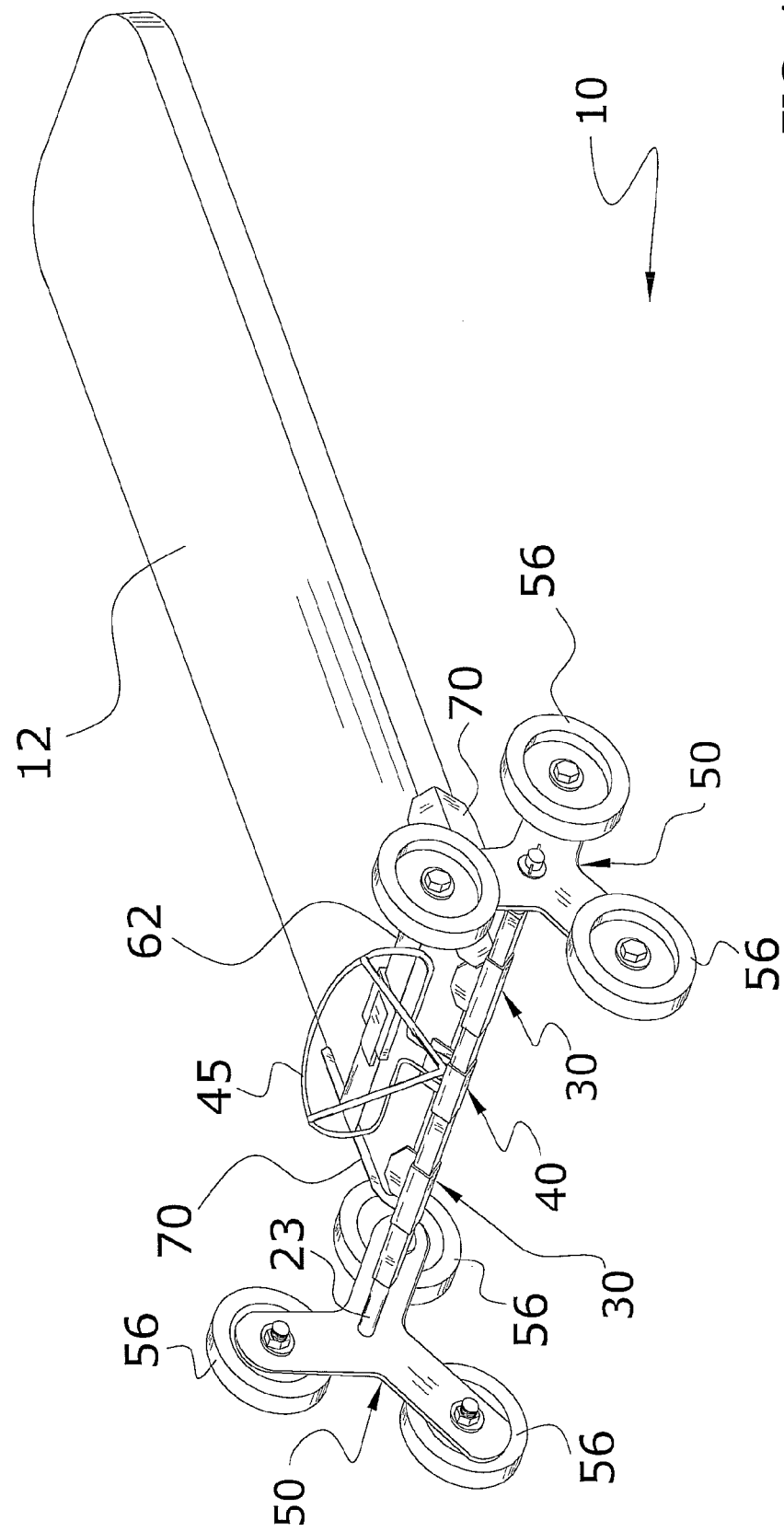
FIG. 1 is an upper perspective view of the present invention attached to a spine board.

Turning now descriptively to the drawings, in which similar reference characters denote similar elements throughout the several views, FIGS. 1 through 18 illustrate a wheeled attachment system 10, which comprises a front support 20 including a cross member 22, a plurality of wheels 56 and at least one support 30 and a foot rest assembly 40, wherein at least three of the plurality of wheels 56 are rotatably attached at each opposing end of the cross member 22 and wherein the plurality of wheels 56 form a tri-wheeled assembly upon each of the opposing ends of the cross member 22. The support 30 and foot rest assembly 40 extend outwardly from the cross member 22 between the opposing ends of the cross member 22, wherein the support 30 and foot rest assembly 40 stabilize the front support 20 upon an object 12 (e.g. spine board, etc.) positioned adjacent the front support 20. An attachment structure 60 extends from the front support 20, wherein the attachment structure 60 removably secures the attachment structure 60 and the front support 20 to the object 12. A pair of extension members 80 interconnect a wheel mount 51 of each of the pair of wheel assemblies 50 with the front support 20 so that a center rotational axis of the wheel mount 51 of the pair of wheel assemblies 50 is vertically offset with the front support 20.

B. Spine Board

Figure 2:
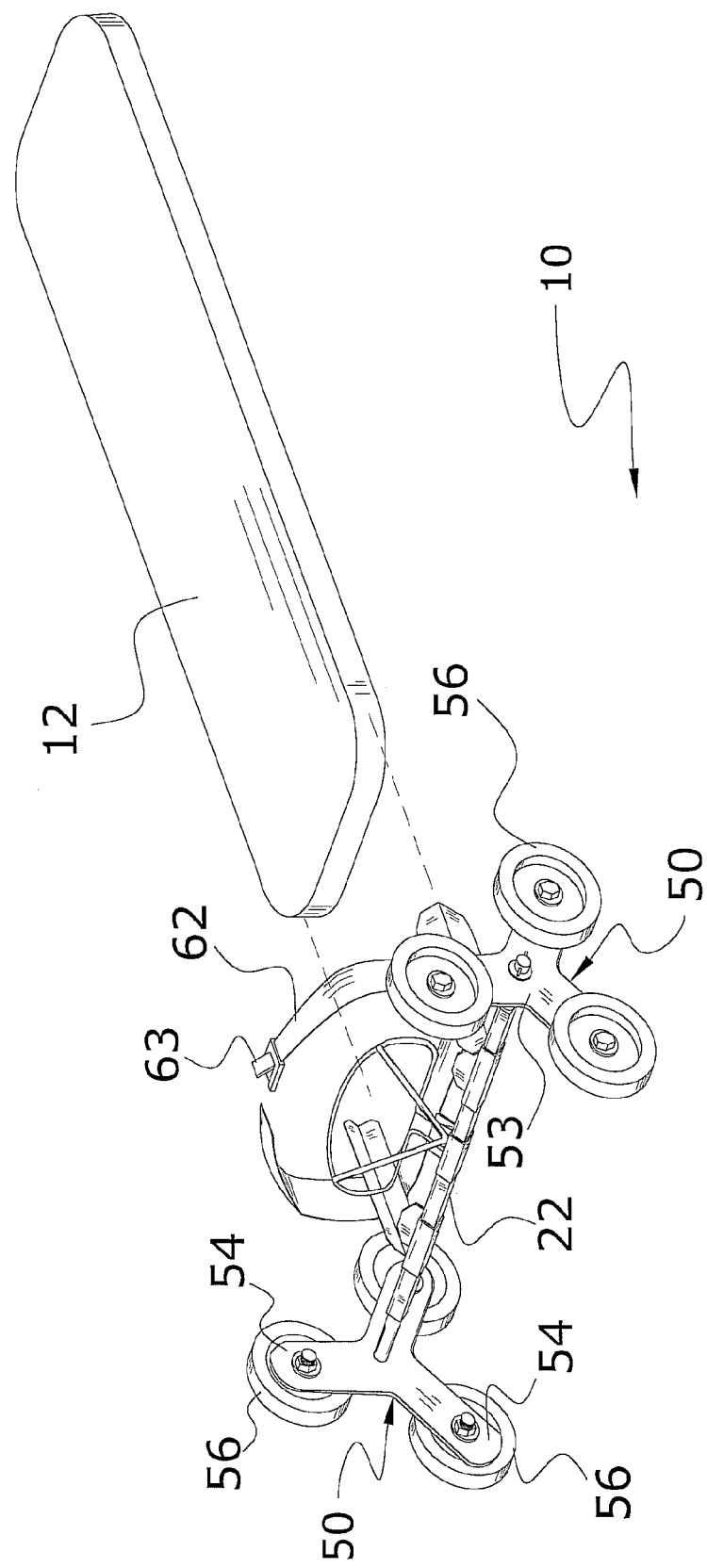
FIG. 2 is an upper perspective view of the present invention exploded from a spine board.

The present invention preferably attaches to an end of a spine board 12 (i.e. backboard) as illustrated in FIGS. 1 and 2. The spine board 12 is generally comprised of a rigid and durable structure and material, such as wood or plastic. The spine board 12 is also generally substantially rectangular in shape and of a size to accommodate an individual (i.e. patient) lying upon the spine board 12 (e.g. 5-7 feet in length, 9-18 inches in width, etc.).

Figure 9:
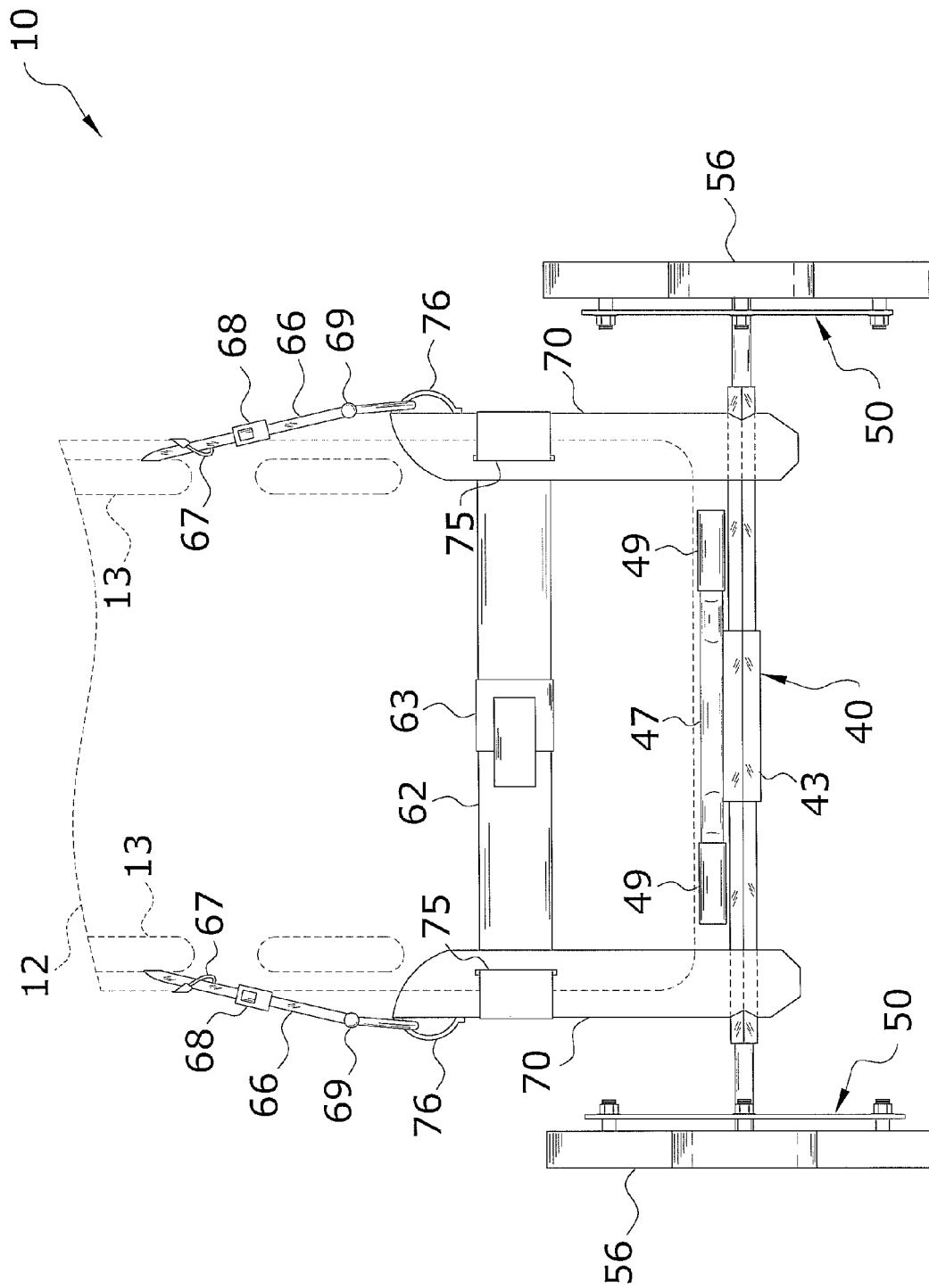
FIG. 9 is a top view of the embodiment as shown in FIG. 8 of the present invention attached to a spine board.
Figure 10:
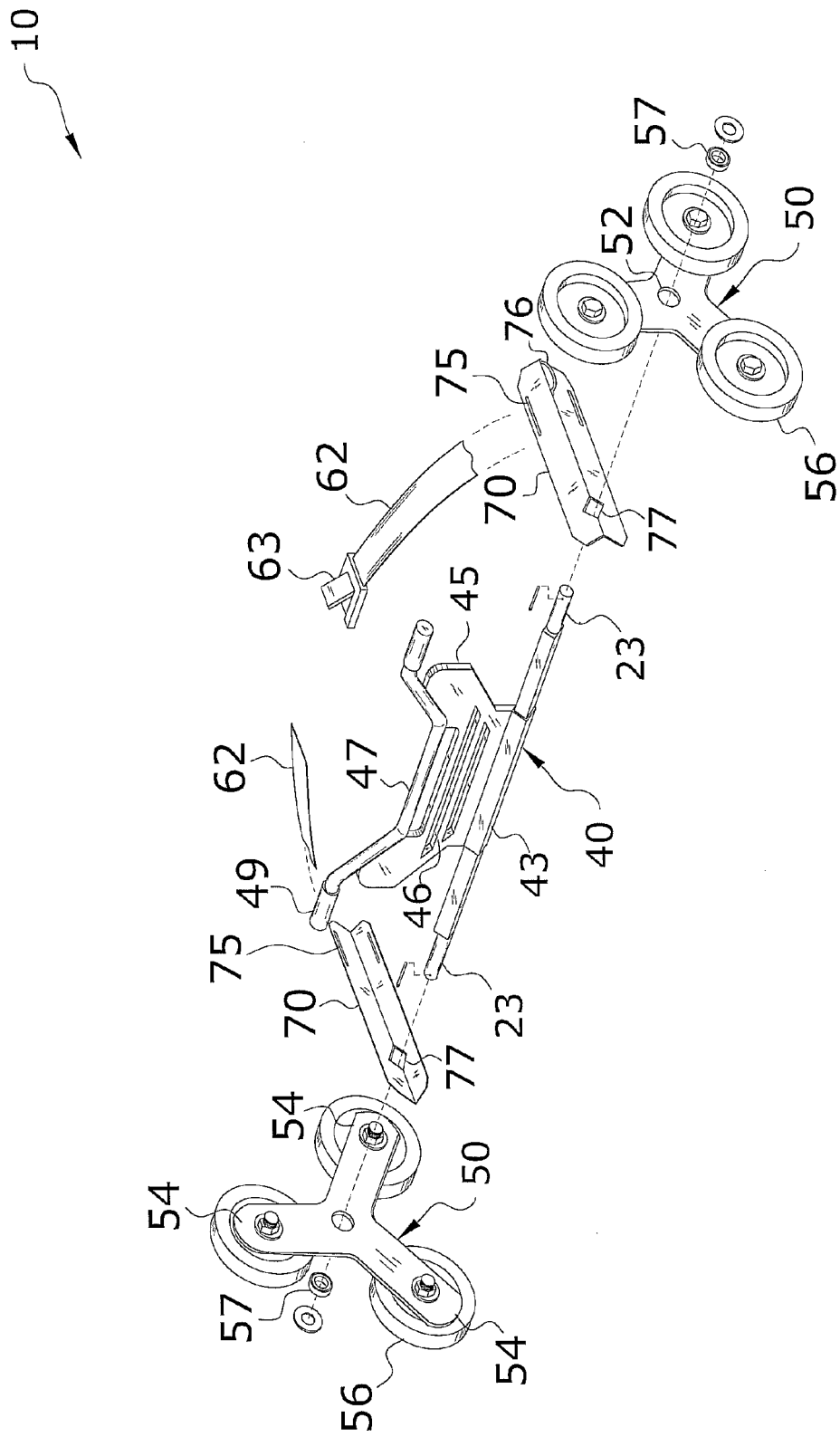
FIG. 10 is an exploded upper perspective view of the embodiment as shown in FIG. 8.
Figure 11:
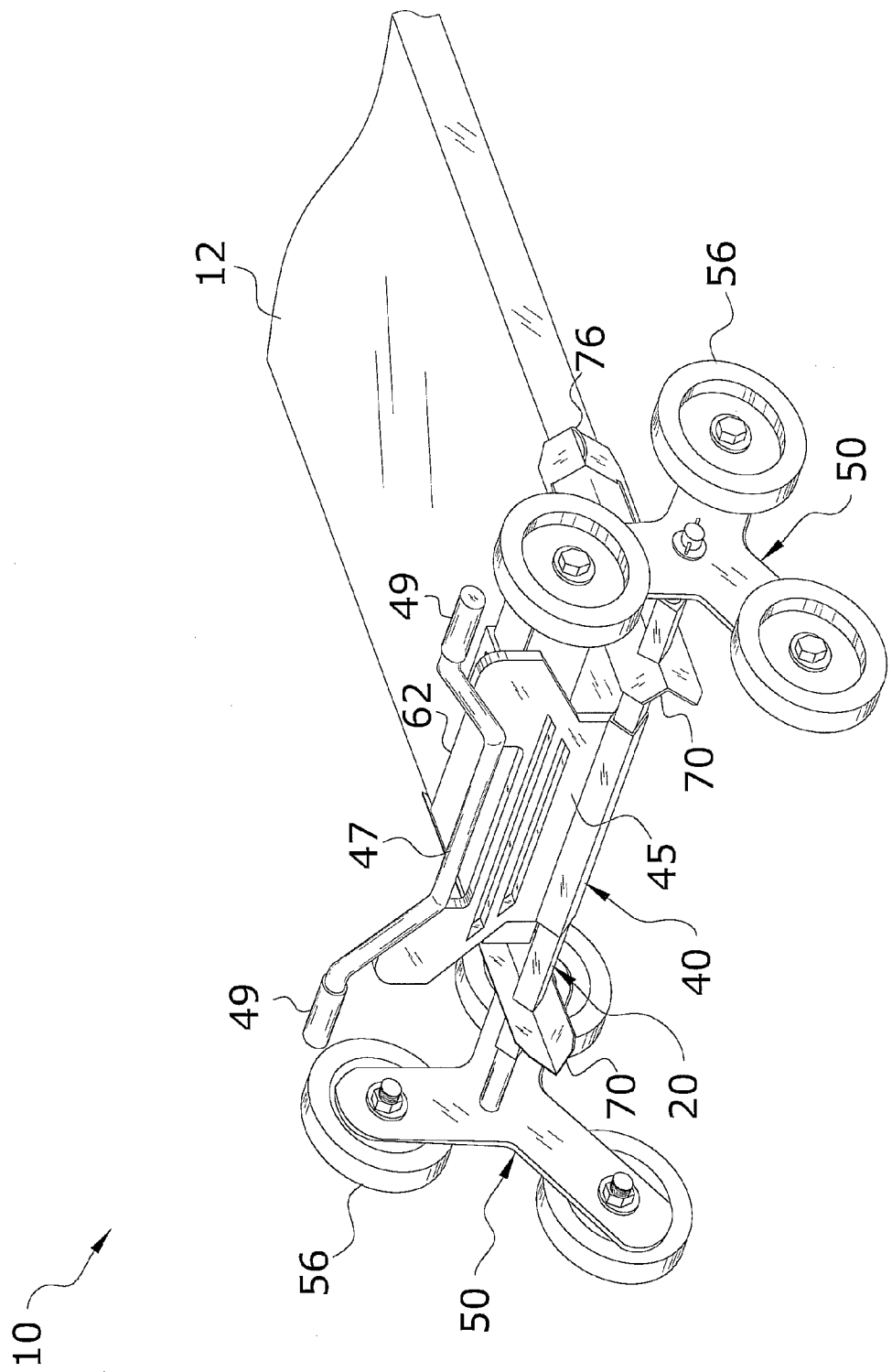
FIG. 11 is an upper perspective view of the embodiment as shown in FIG. 8 attached to a spine board.

The present invention further preferably attaches to the end of the spine board 12 where the patient's feet are or will be positioned and the patient may rest their feet upon the footrest 45 of the present invention. It is appreciated that the present invention may attach to various other structures and apparatuses rather than a spine board 12 all which are desired to be easily maneuvered via rolling the structure or apparatus upon a surface (e.g. flat surface, flight of stairs 19, etc.). The spine board 12 may also include a plurality of side openings 13 lining the outer edges of the spine board 12. The side openings 13 assist in providing a point to secure the front support 20 to the spine board 12 via the retaining strap 66 as illustrated in FIG. 9.

C. Front Support

The front support 20 is positioned against the end of the spine board 12 and is secured to the spine board 12 via the attachment structure 60 as illustrated in FIGS. 1 and 2. The front support 20 supports the spine board 12 above the ground via the plurality of wheels 56 extending from opposing ends of the front support 20. The front support 20 is comprised of a durable and strong material capable of withstanding the weight of the patient and the spine board 12 over various surfaces (e.g. flat surfaces, flight of stairs 19, etc.).

i. Cross Member

The front support 20 includes a cross member 22 extending along an entire length of the front support 20. The cross member 22 includes a primary axle 23 and a sleeve member 24 as illustrated in FIGS. 1 through 6. The primary axle 23 and the sleeve member 24 are preferably integrally formed; however it is appreciated that the primary axle 23 and the sleeve member 24 may be comprised of separate structures attached together in some manner (e.g. weldably, fastened, etc.). It is appreciated that the primary axle 23 extends through the sleeve member 24, wherein the sleeve member 24 of the cross member extends along a substantial longitudinal perimeter of the cross member 22.

The primary axle 23 is preferably comprised of a cylindrical shaped configuration so that the wheel mount 51 may efficiently rotate about the primary axle 23 of the cross member 22. The primary axle 23 further extends outwards from each opposing end of the sleeve member 24. If using more than one primary axle 23, the primary axles 23 preferably mirror each other about the sleeve member 24, wherein the primary axles 23 are comprised of substantially similar configurations. The primary axle 23 may also each include a hole(s) to receive a pin or bolt to securely attach the wheel mount 51 to the respective end of the primary axle 23.

The sleeve member 24 extends between the ends of the primary axle 23 as illustrated in FIGS. 1 through 6. The sleeve member 24 is preferably comprised of an elongated configuration (e.g. 18 inches, etc.) and further comprised of a square or triangular cross-sectional shaped configuration. The square or triangular cross-sectional configuration allows the outer supports 30 and the foot rest assembly 40 to efficiently attach to the sleeve member 24 without rotating around the sleeve member 24, wherein the corners of the square or triangular shape keep the outer supports 30 and the foot rest assembly 40 from rotating. It is appreciated however that the sleeve member 24 may be comprised of various other configurations rather than the preferred embodiment, all which allow the outer supports 30 and the foot rest assembly 40 to efficiently attach to the sleeve member 24.

The length of the sleeve member 24 is preferably substantially similar or slightly greater than the maximum width of the spine board 12. The outer supports 30 may be adjusted about the sleeve member 24, wherein the outer supports 30 are positioned at a respective outer side of the spine board 12 while remaining positioned upon the sleeve member 24 as illustrated in FIGS. 1 through 6.

ii. Outer Supports

Figure 4:
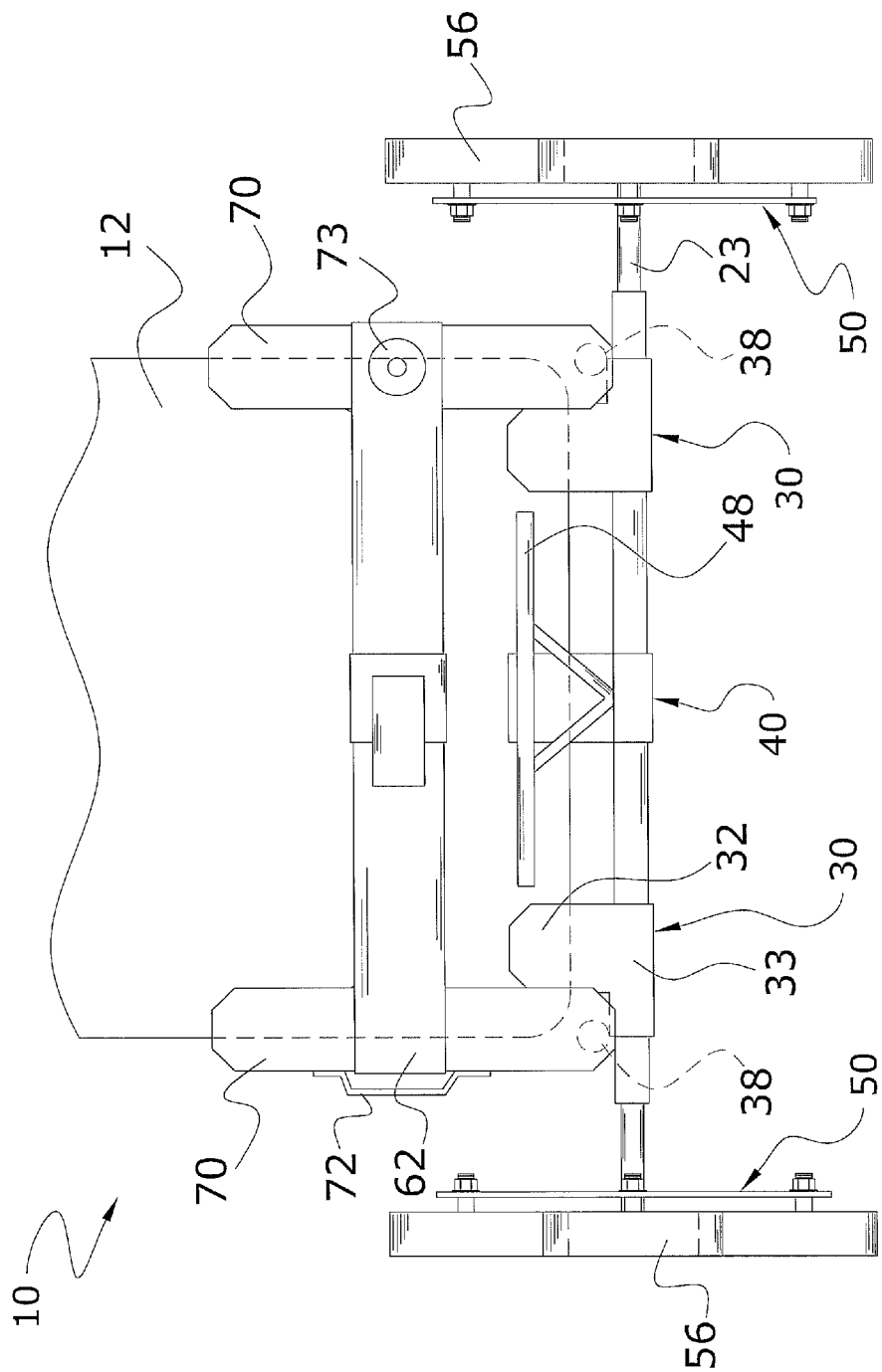
FIG. 4 is a top view of the present invention attached to a spine board.
Figure 5:
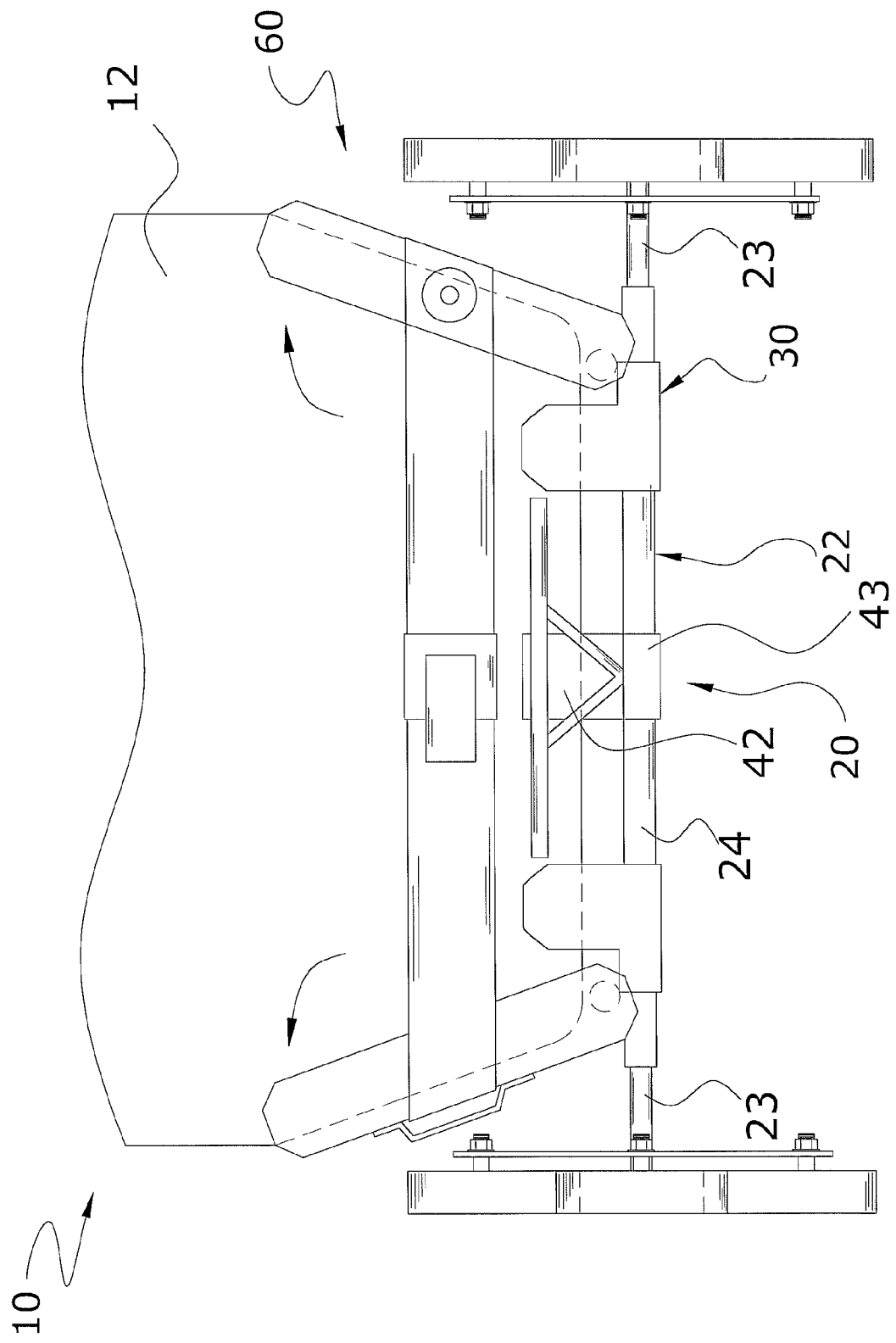
FIG. 5 is a top view of the present invention attached to a spine board, wherein the outer supports are pivoted outwards.
Figure 6:
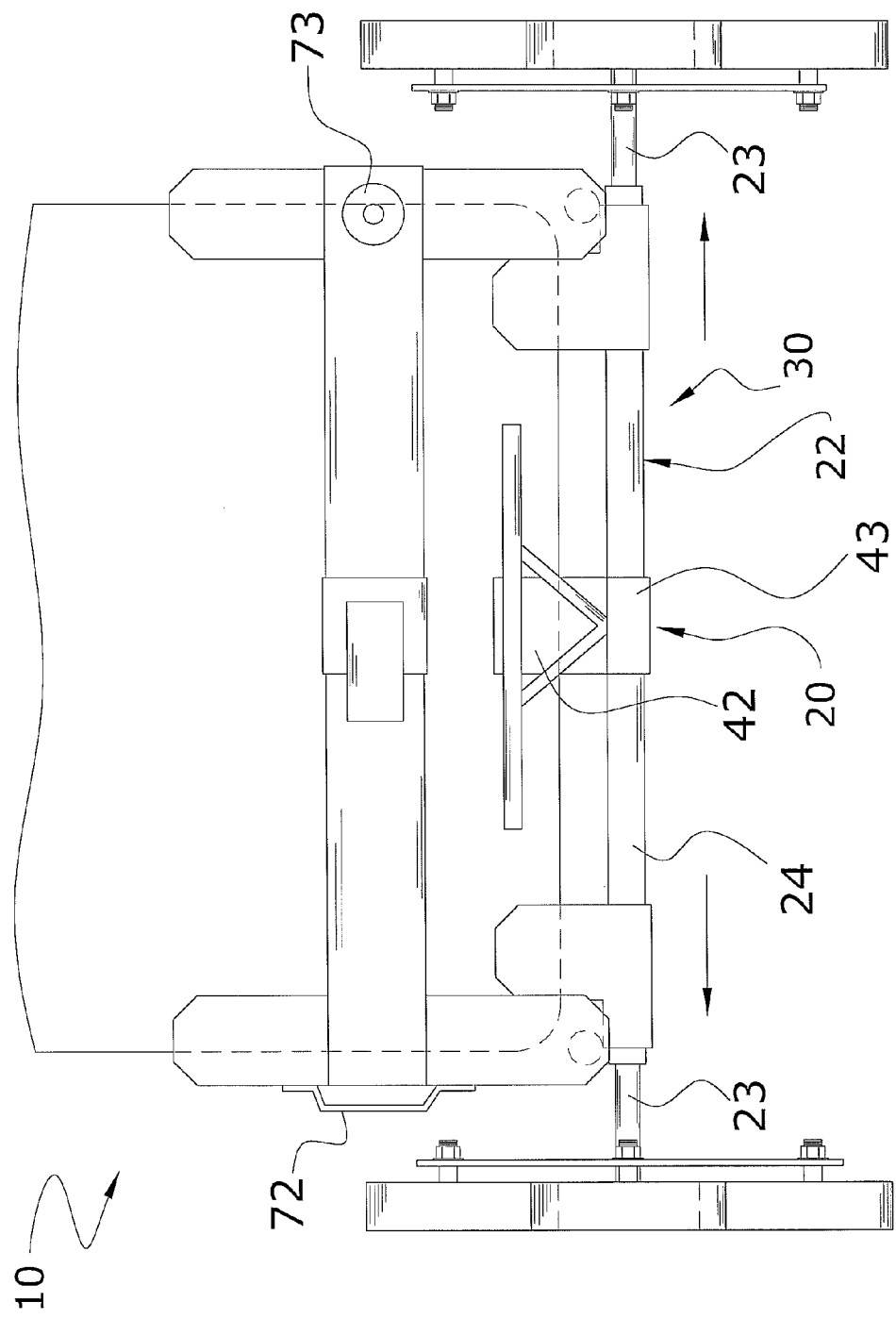
FIG. 6 is a top view of the present invention attached to a spine board, wherein the outer supports are slid outwards.

The outer supports 30 are slidably positioned upon opposing ends of the sleeve member 24 of the cross member 22 and are utilized to stabilize the front support 20 upon the spine board 12 as illustrated in FIGS. 4 and 6. The outer supports 30 are preferably comprised of substantially similar configurations. The outer supports 30 each include an outer retaining portion 32 and an outer sleeve portion 33, wherein the outer retaining portion 32 extends from the outer sleeve portion 33.

Figure 7:
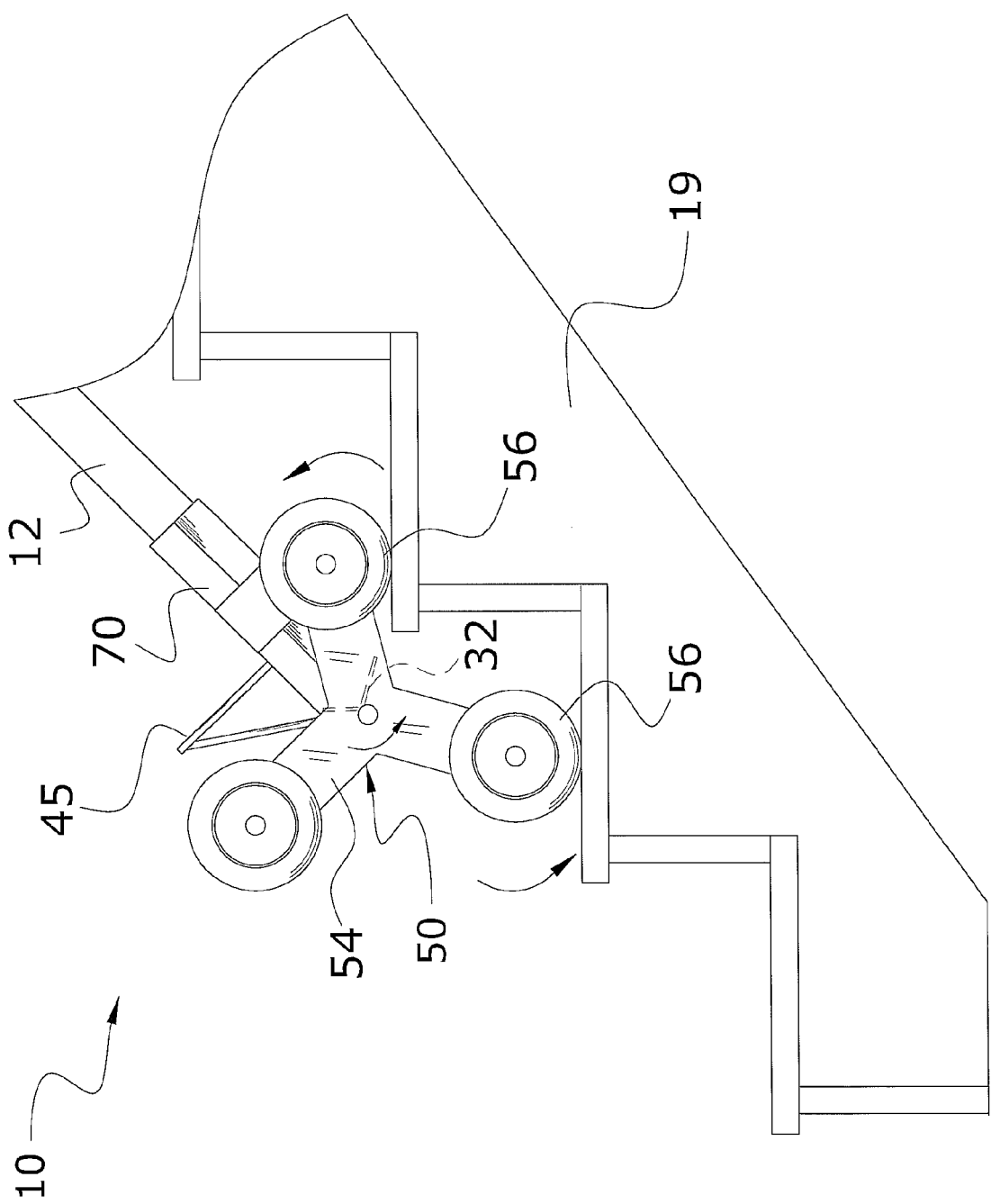
FIG. 7 is a side view of the present invention attached to a spine board and being directed along a flight of stairs.
Figure 8:
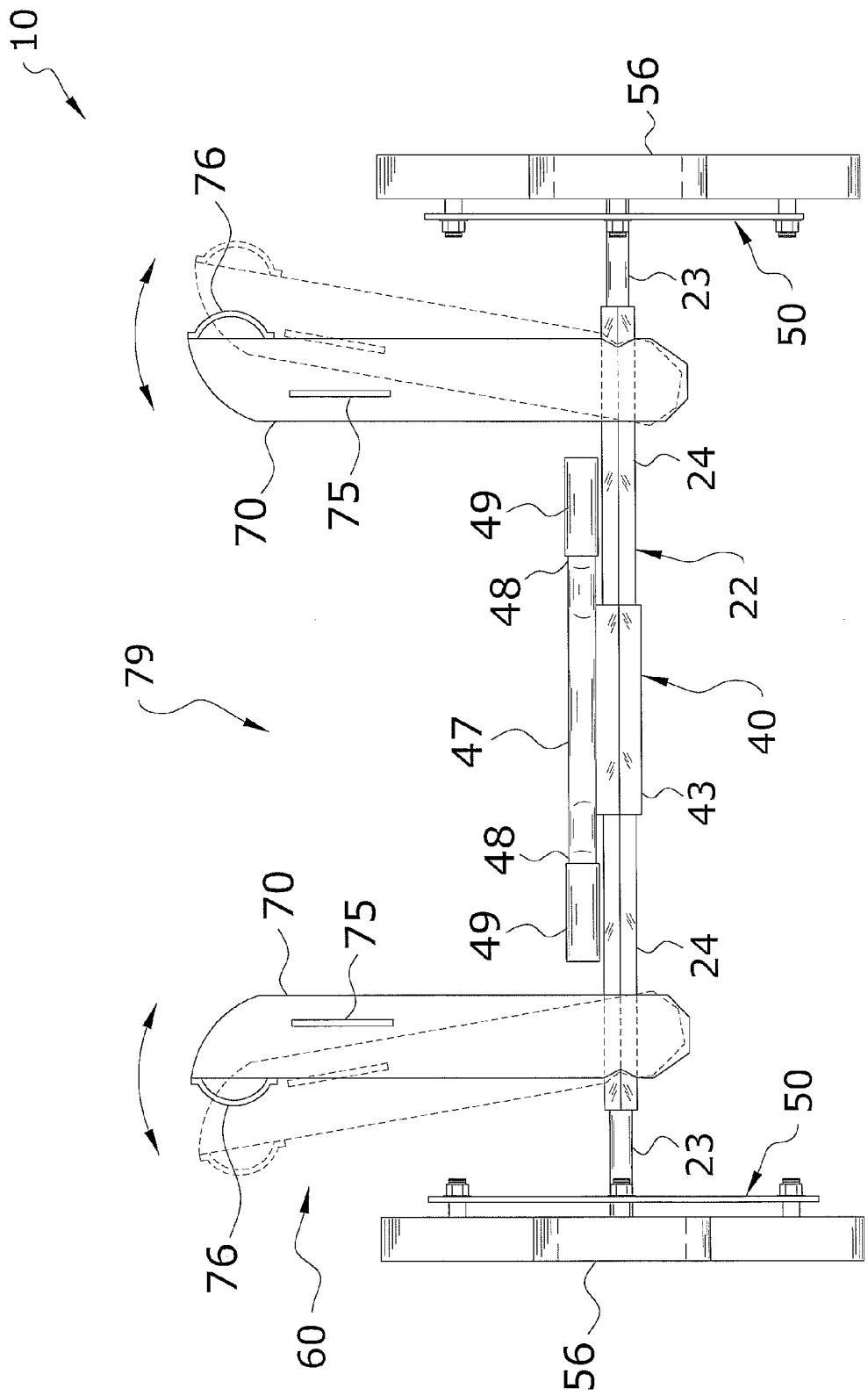
FIG. 8 is a top view of another embodiment of the present invention.

The outer sleeve portion 33 is comprised of a hollow configuration and is further comprised of a substantially similar cross-sectional shape and configuration as the sleeve member 24. The outer sleeve portion 33 is able to slidably adjust along the sleeve member 24 to accommodate for various width spine boards 12. The outer retaining portion 32 is preferably comprised of a V-shaped cross-sectional configuration as illustrated in FIG. 7. The V-shape of the outer retaining portion 32 also is able to accommodate various thicknesses of spine boards 12 (e.g. ¾ inches, 3 inches, etc.). The outer retaining portion 32 receives the end of the spine board 12 within the V-shape of the outer retaining portion 32. It is appreciated that the outer retaining portion 32 may be comprised of various configurations all which adequately receive the end of the spine board 12. In one embodiment, the outer supports 30 may be omitted and the foot rest assembly 40 may directly attach to the side supports 70.

iii. Foot Rest Assembly

The foot rest assembly 40 is preferably fixedly or slidably attached to the longitudinal center of the sleeve member 24 of the cross member 22 and is utilized to stabilize the front support 20 upon the spine board 12 as illustrated in FIGS. 1 through 6. A sleeve portion 43 is preferably comprised of substantially similar configuration as the outer support 30, wherein the foot rest assembly 40 also includes the sleeve member portion 43 and a retaining portion 42 extending from the sleeve portion 43.

The sleeve portion 43 is comprised of a hollow configuration and is further comprised of a substantially similar cross-sectional shape and configuration as the sleeve member 24. The sleeve portion 43 is preferably fixedly attached to the cross member 22 of the front support 20. It is appreciated that the center retaining portion 42 may directly extend from the sleeve member 24 rather than utilizing the sleeve member portion 43.

The retaining portion 42 is preferably comprised of a V-shaped cross-sectional configuration similar to the outer retaining portions 32. The retaining portion 42 receives the end of the spine board 12 within the V-shape of the retaining portion 42. The V-shape of the center retaining portion 42 also is able to accommodate various thicknesses of spine boards 12 (e.g. ¾ inches, 3 inches, etc.). It is appreciated that the retaining portion 42 may be comprised of various configurations all which adequately receive the end of the spine board 12.

Figure 3:
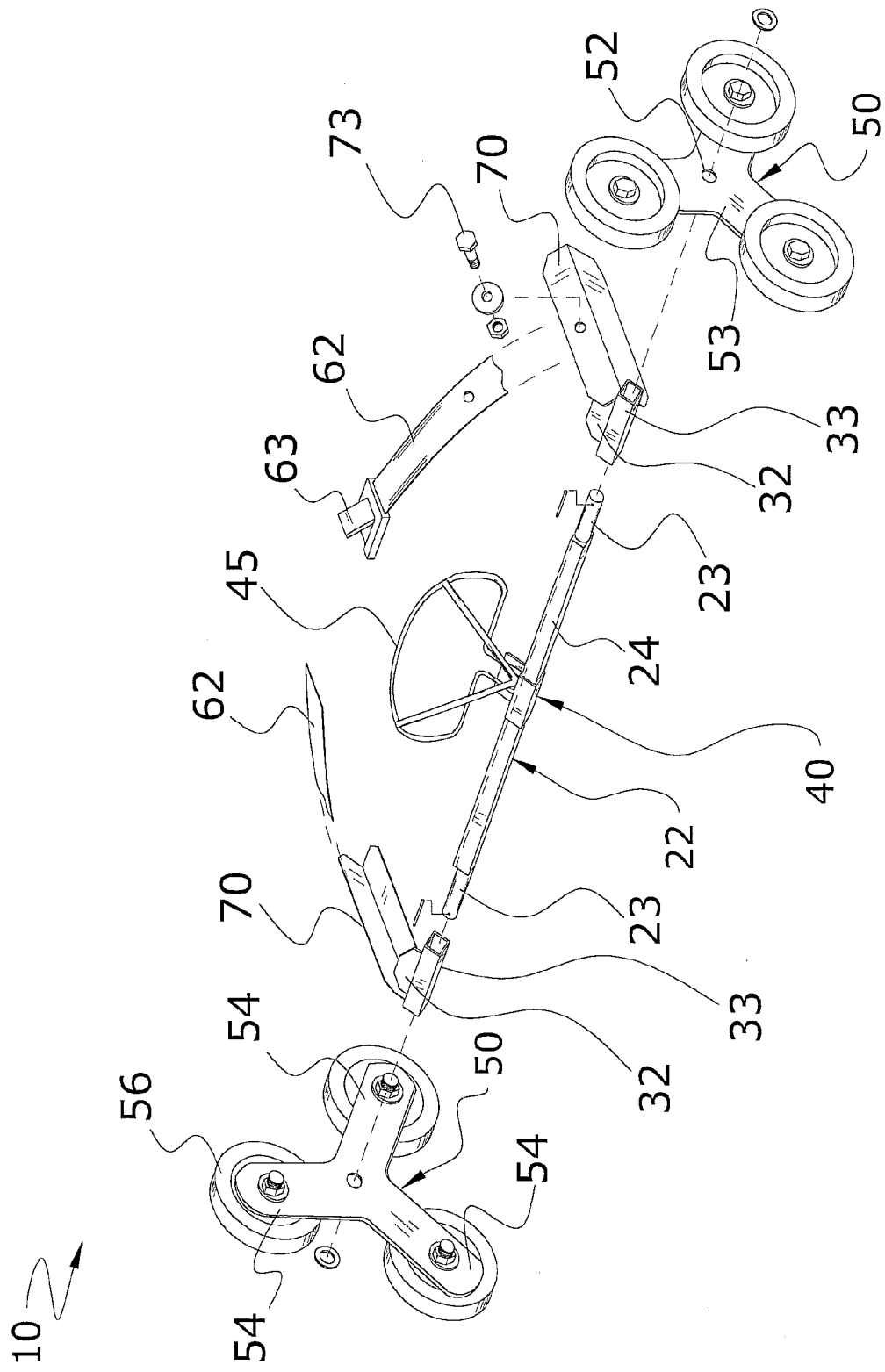
FIG. 3 is an exploded upper perspective view of the present invention.

The foot rest assembly 40 also includes a footrest 45 extending from the upper end of the retaining portion 42 or the upper end of the sleeve portion 43 and towards the spine board 12. The footrest 45 preferably extends at an upward angle as illustrated in FIGS. 1 through 3. The footrest 45 may include various cross members or be comprised of various configurations, all which allow a patient 17 to comfortably and efficiently position their feet against the footrest 45. It is appreciated that the footrest 45 may also serve various other purposes, such as a handle. The foot rest assembly 40 and footrest 45 may be fixedly attached to the sleeve member 24.

The footrest 45 may include a plurality of cross supports 46 to increase the strength of the footrest 45 and also to increase a surface area of the footrest 45 for the patient to position their foot against. The footrest 45 may also include at least one handle extending from the footrest 45. In the preferred embodiment, the footrest 45 includes a handlebar 47 to allow an operator to more easily maneuver the respective end of the spine board 12. The handlebar 47 preferably extends along the top edge of the footrest 45 and is securely mounted to the footrest 45. The end portions 48 of the handlebar 47 may be bent downward (towards the spine board 12) or away from the spine board 12. The end portions 48 and handlebar 47 may also be comprised of a bicycle shaped handlebar configuration as illustrated FIG. 10. It is appreciated that the handlebar 47 and the footrest 45 may be integrally formed.

The end portions 48 may also include grippers 49 extending around the end portions 48 to increase the grip upon the handlebar 47 by the operator. The grippers 49 may be integrally formed with the end portions 48, such as embedded into the side portions 48 or may be comprised of rubber sleeve members to extend over the side portions 48. The end portions 48 may alternately be knurled in another manner to increase grippage upon the handlebar 47.

Figure 18:
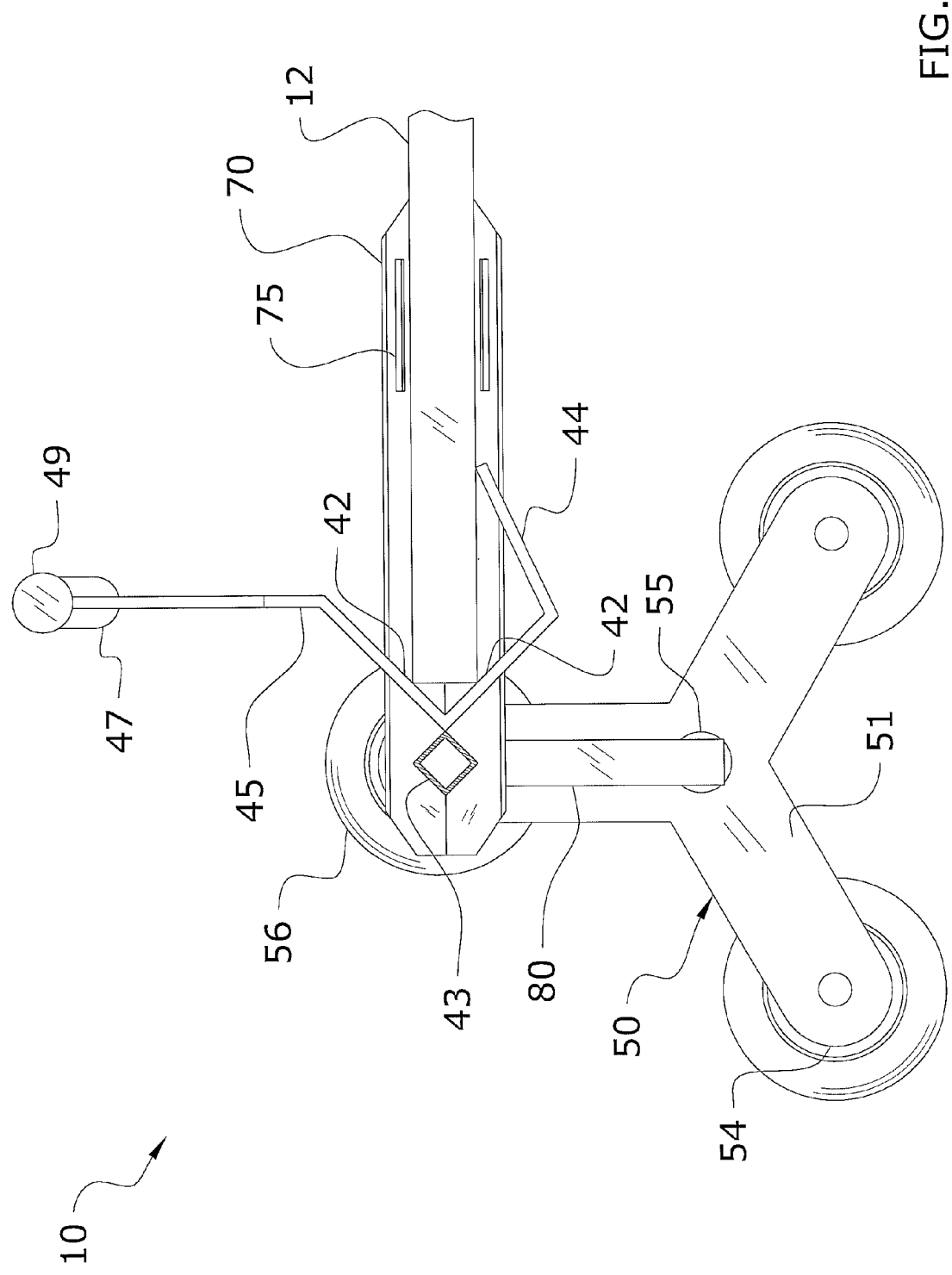
FIG. 18 is a side sectional view of the second new embodiment.

The new embodiment illustrated in FIG. 18 illustrates the use of a riser 44 extending upwardly from the lower part of the retaining portion 42. The riser 44 is comprised of a plate configuration and extends at an angle upwardly and against the bottom of the board 12 to additionally secure the board 12 and prevent upright movements of footrest assembly 40 or slop due to a loose connection of the footrest assembly 40. The riser 44 may extend at various angles from the lower part of the retaining portion 42 all of which allow for the riser 44 to contact the bottom of the board 12 while the board 12 is in a flat orientation as illustrated in FIG. 18.

D. Tri-Wheeled Assemblies

The present invention includes a pair of wheel assemblies 50 extending from opposing ends of the front support 20 to support the spine board 12 off of the ground. The wheel assemblies 50 may include various numbers of wheels 56 upon each side of the front support 20 (e.g. 1, 2, 3, etc.). The present invention includes a pair of wheel mounts 51, wherein each wheel mount 51 is positioned upon a respective end of the primary axle 23. The wheel mounts 51 may be secured upon the primary axle 23 via various methods (e.g. cotter pin, bolt, etc.). The wheel mounts 51 are comprised of substantially similar configurations as illustrated in FIGS. 1 through 7. The wheel mounts 51 also mirror each other about the longitudinal center of the cross member 22.

The wheel mounts 51 each include a center aperture 52 extending through a center portion 53 of the wheel mount 51 and concentric with the wheel mount 51. The center aperture 52 receives the primary axle 23 of the cross member 22 to position the wheel mount 51 upon the primary axle 23. The center aperture 52 allows the wheel mount 51 to spin freely about the primary axle 23, wherein the entire wheel mount 51 is able to spin. The wheel mount 51 may also include a bearing structure 57 adjacent the center portion 53 to allow the wheel mount 51 to spin faster and with greater ease about the primary axle 23.

The wheel mounts 51 are each preferably comprised of a tri-arm configuration as illustrated in FIG. 7, wherein the wheel mounts 51 each preferably include three extending portions 54 extending outwards from the center portion 53. The extending portions 54 are each preferably equidistantly spaced from one another along an outer perimeter of the center portion 53 and each include a wheel 56 rotatably attached at the distal end of the extending portion 54 from the center portion 53 to form a tri-wheel configuration upon each wheel mount 51.

The wheels 56 are preferably comprised of a rubber or plastic material. The wheels 56 spin freely about the wheel mount 51, wherein the wheels 56 are able to rotate about the wheel mount 51 in addition to the wheel mount 50 rotating about the cross member 22 as illustrated in FIG. 7. The wheels 56 may be attached to the wheel mount 51 in various manners, such as utilizing a bolt or axle and cotter pin. The wheels 56 may also each include a bearing structure 57 attached between the wheels 56 and the extending portion 54 to allow the wheels 56 to spin more easily.

Figure 12:
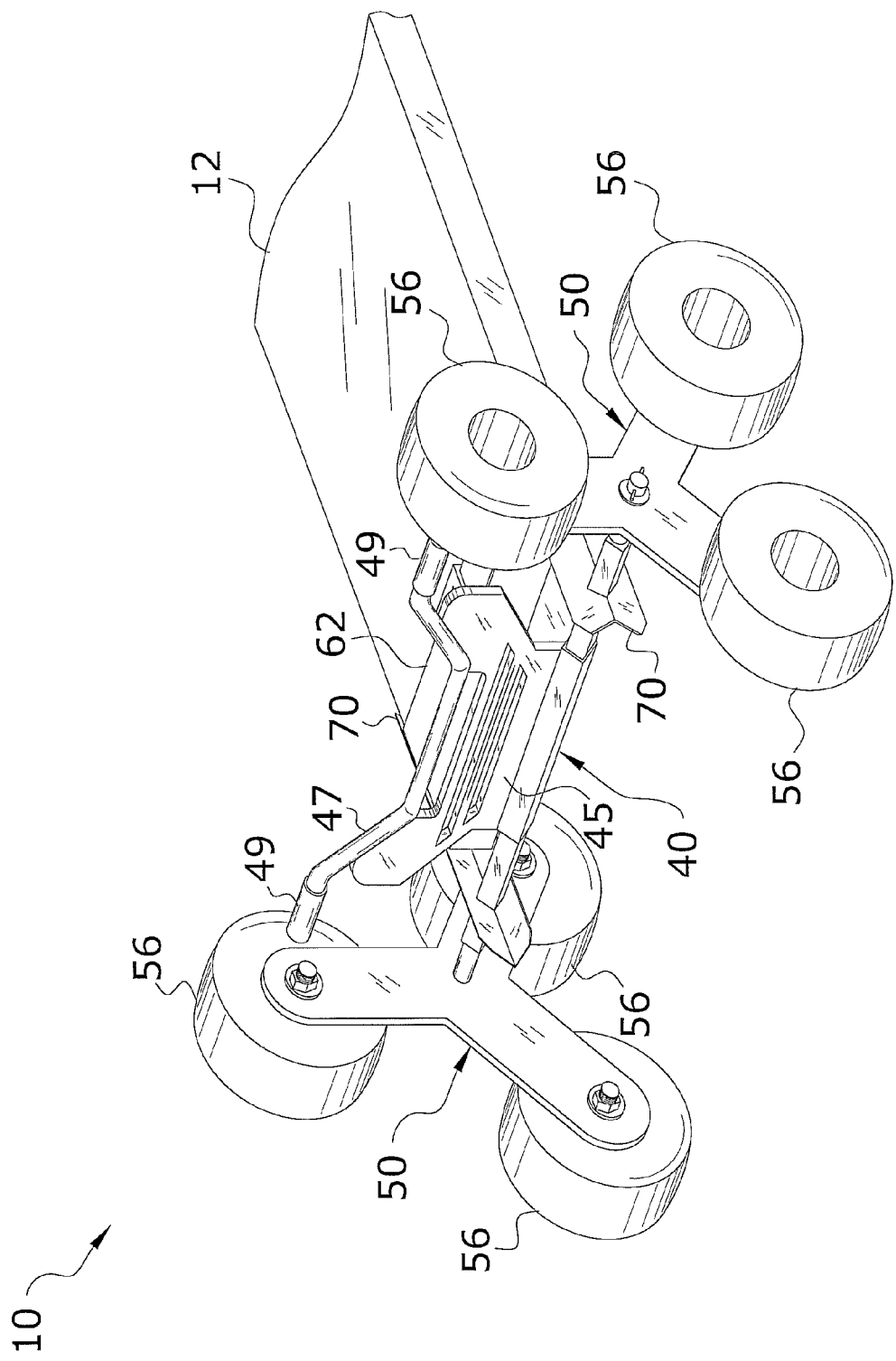
FIG. 12 is an upper perspective view of the embodiment as shown in FIG. 8 attached to a spine board, wherein the wheels have been enlarged so as to travel more smoothly over various types of terrain.

The distance from an uppermost wheel 56 to a lowermost wheel 56 upon each wheel mount 51 is of a length great enough to allow adjacent wheels to stretch from stair to stair along the flight of stairs 19 as illustrated in FIG. 7. This allows the wheels 56 and wheel mount 51 to smoothly rotate when traveling up and down the stairs 19 (i.e. crawl up and down the stairs in a smooth manner), wherein the spine board 12 does not experience any jerky or up and down movement when maneuvering the spine board 12 and attached present invention over the flight of stairs 19. The wheels 56 may also be enlarged substantially as illustrated in FIG. 12 to provide a more buoyant and bouncy tire that may more smoothly be rolled over various types of terrain.

The new embodiment includes vertical extension members 80 to attach on each end of the primary axle 23 and offset the rotational axis of the wheel mount 50. The need for the extension member 80 arises because of the need for added clearance when traveling up or down stairs. The extension member 80 adds stability to the board 12 by preventing the board 12 from engaging the steps. The extension members 80 may be comprised of various lengths (e.g. 3 inches, 16 inches, etc.) to raise the board 12 as high as needed when traveling over different height steps.

In one embodiment, the extension members 80 are comprised of a U-shaped elongated structure. The extension members 80 in this embodiment are preferably used when the stairway or allotted room to travel along the stairway is narrow. From FIGS. 14 and 15, it is illustrated that the outside surface of the extension member 80 is flat, thus preventing the extension members 80 from catching upon foreign or stray objects. It is also illustrated that the wheel assemblies 50 extend inwardly rather than outwardly (as shown in other embodiments of the present invention). The advantage of this, again, is to keep the overall present invention as small in width as possible to allow for use in tight or small areas. Another noticeable feature of the embodiment in FIGS. 14 and 15 is that since the wheels assemblies 50 face inwardly, the height of the extension members 80 must be great enough to prevent the wheel assemblies 50 from engaging the bottom of the spine board 12.

Figure 14:
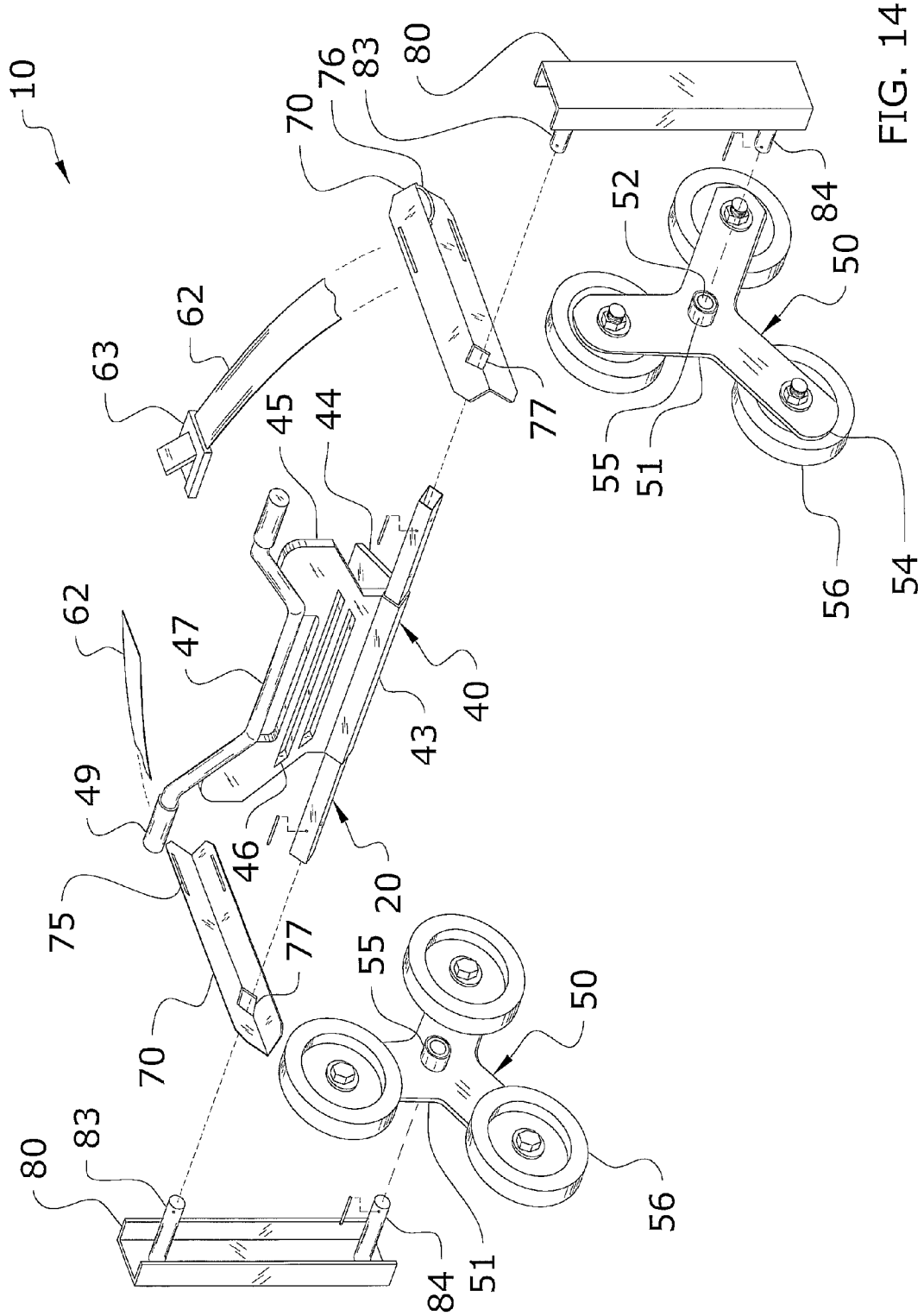
FIG. 14 is an exploded upper perspective view of a first new embodiment of the present invention.
Figure 15:
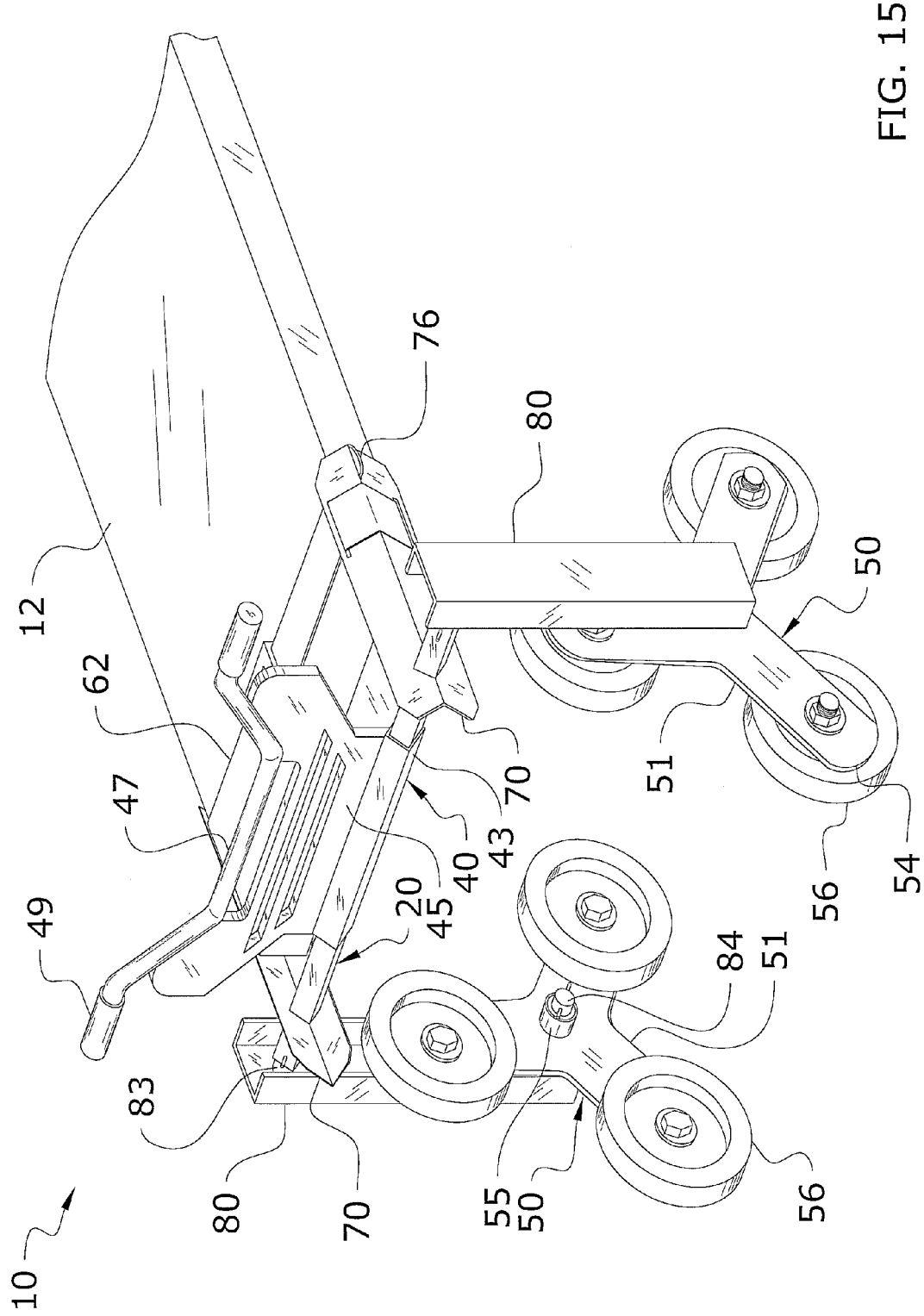
FIG. 15 is an upper perspective view of the first new embodiment of the present invention attached to a spine board.
Figure 16:
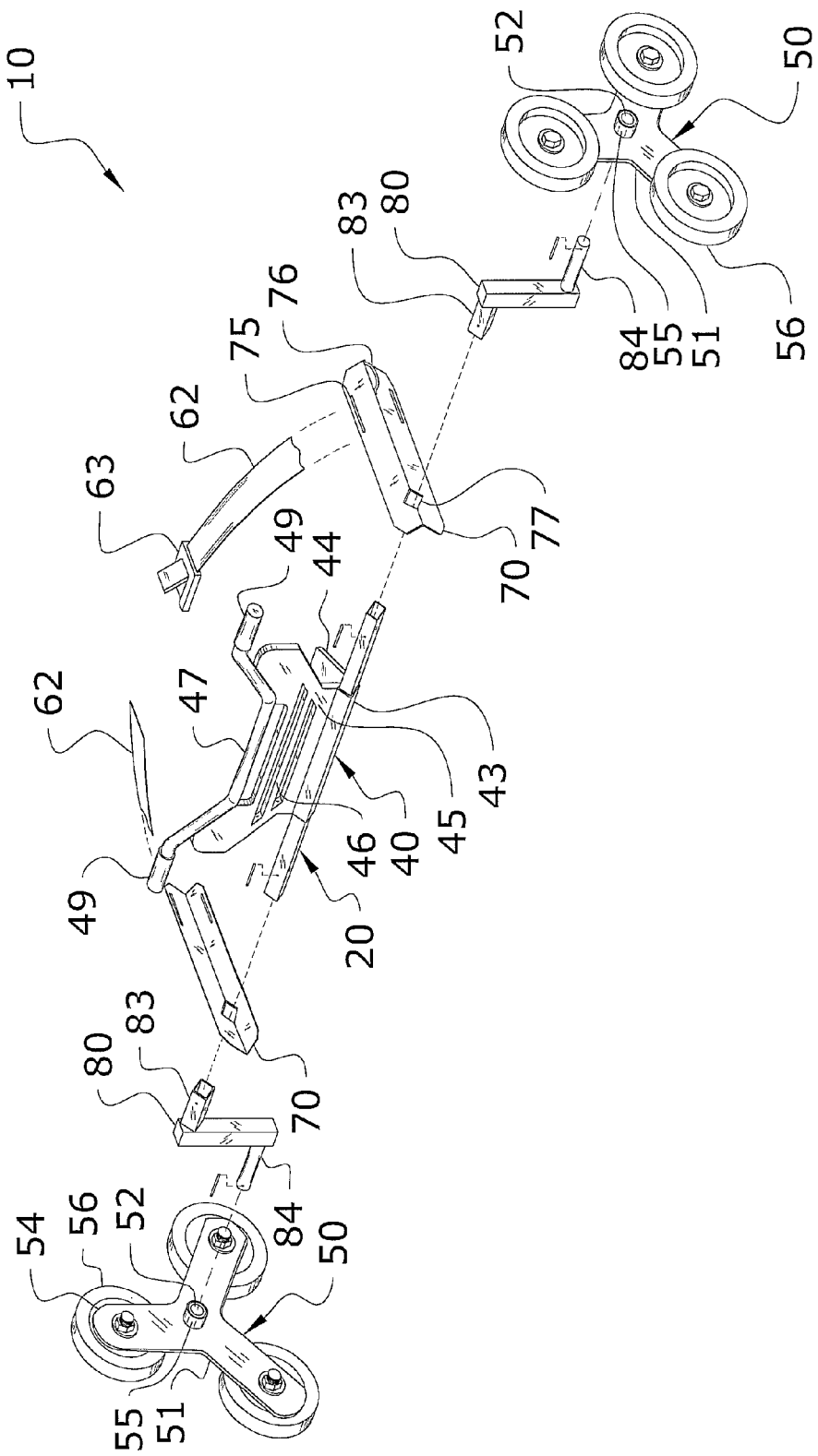
FIG. 16 is an exploded upper perspective view of a second new embodiment of the present invention.
Figure 17:
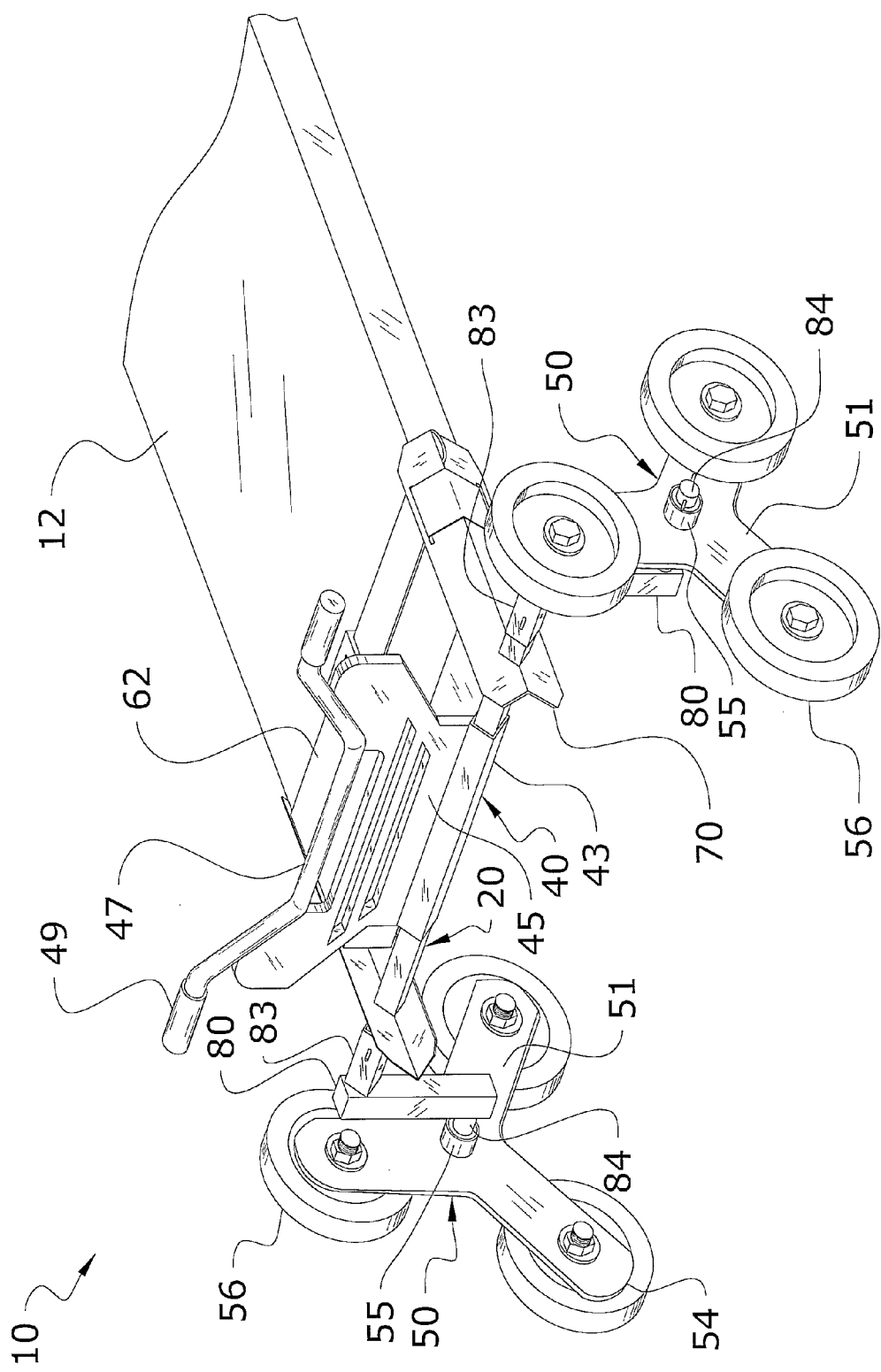
FIG. 17 is an upper perspective view of the second new embodiment of the present invention attached to a spine board.

In another embodiment, as illustrated in FIGS. 16 and 17, the extension member 80 is comprised of a lesser length and thus the overall strength, shown by width, etc., does not need to be the quality as in the embodiment shown in FIGS. 14 and 15. The embodiment in FIGS. 16 and 17 is configured so that the wheels assemblies 50 extend outwardly. Advantages of this are that the extension members 80 still give the extra clearance desired to overcome various stair heights and also provide a wider base and thus more stable structure for the spine board 12.

Both embodiments shown in FIGS. 14 through 17 include an upper connecting element 83 and a lower connecting element 84 to secure the extension members 80 to both the front support 20 and the wheel assemblies 50. The upper connecting elements 83 may be comprised of a cylindrical, square cross-sectional or other configuration as desired with the particular application. Both upper connecting elements 83 may extend inwardly and are received by the inner receiver opening 77 of the side support 70 and then the primary axle 23 and secured therein by a bolt, cotter pin, etc.

The lower connecting elements 84 are preferably comprised of a cylindrical shaped configuration to allow the wheel mount 51 to freely rotate around the lower connecting element 84. The wheel mount 51 may include a sleeve extension 55 extending from the center aperture 52 so as to more securely receive and secure the lower connecting element 84 via the center aperture 52. The lower connecting element 84 may likewise be secured therein by a bolt, cotter pin, etc. It is shown that the lower connecting elements 84 may extend inwardly or outwardly depending on which type of extension member 80 is utilized as illustrated in FIGS. 14 through 17.

E. Attachment Structure

The attachment structure 60 extends from the front support 20 and secures the front support 20 to the spine board 12 as illustrated in FIGS. 1 and 2. The attachment structure 60 is comprised of a durable and strong material capable of withstanding the weight of the spine board 12 and patient and also holding the front support 20 upon the spine board 12.

i. Side Supports

The attachment structure 60 includes a pair of side supports 70, wherein each side support 70 extends from a respective outer support 30 of the front support 20 and is positioned along the sides of the spine board 12 adjacent the end of the spine board 12 as illustrated in FIGS. 1 and 2. The side supports 70 are preferably pivotally (via a hinge structure 38) attached to the outer supports 30 to allow the side supports 70 to extend along various angled sides of various spine boards 12 (e.g. sides of spine board 12 define a 90 degree angle with end of spine board 12, sides of spine board 12 define a 45 degree angle with end of spine board 12, etc.).

The hinge structure 38 may be comprised of various configurations, such as but not limited to a pin, a hinge or various other mechanisms that allow the side supports 70 to pivot about the outer supports 30. The side supports 70 are also selectively perpendicular to the outer supports 30. It is appreciated that the side supports 70 may define various other angles with the outer supports 30 when pivoted about the outer supports 30 (e.g. 45 degree angle, etc.).

The side supports 70 are preferably comprised of an elongated configuration and further preferably are comprised of a V-shaped cross-sectional shape. The V-shape of the side supports 70 is able to accommodate various thicknesses of spine boards 12 (e.g. ¾ inches, 3 inches, etc.). Each side support 70 preferably faces the opposing side support 70, wherein the spine board 12 is positioned between the two side supports 70. The side supports 70 also preferably include a groove adjacent the outer support 30 to allow the side support 70 to efficiently pivot about the outer support 30 without engaging the outer support 30. The corners of the side supports 70, the foot rest assembly 40 and the outer supports 30 are also preferably rounded or angled to prevent the patient 17 from cutting or scraping themselves upon the side supports 70, the foot rest assembly 40 or the outer supports 30.

At least one of the side supports 70 preferably includes a loop member 72 extending along an outer side of the side support 70 to receive the strap 62. The loop member 72 subsequently prevents the strap 62 from sliding off of the side support 70. The opposing side support 70 may also include a second loop member 72 to provide a similar purpose as previously described. In the preferred embodiment, the opposing side support 70 includes a fastener 73 to fixedly secure the strap 62 to the side support 70. The fastener 73 may be comprised of various configurations, such as but not limited to a bolt.

In one embodiment, the side supports 70 each include an inner receiver opening 77 to receive the sleeve member 24 of the cross member 22. The inner receiver openings 77 are preferably comprised of a rectangular or diamond shaped configuration to substantially match up with the cross-sectional shaped configuration of the sleeve member 24 of the cross member 22. The inner receiver openings 77 extend around the sleeve member 24 of the cross member structure. It is appreciated that the inner receiver openings 77 are slightly larger than the perimeter of the sleeve member 24 so that the side supports 70 are allowed to pivot slightly for easy removal from and insertion into of the spine board 12 between the side supports 70.

The side supports 70 also each include an elongated slot 75 extending longitudinally parallel through the side supports 70 and also parallel with the spine board 12. The elongated slot 75 is preferably positioned near an primary axle of the side supports 70 opposite the inner receiver opening 77. The slot 75 slidably receives the strap 62 in a method of attaching the strap 62 to the side supports 70.

The side supports 70 also may include an outer loop member 76 extending from the primary axle of the side supports 70. The outer loop member 76 is preferably positioned outside of the slots 75 so that the strap 62 extending through the slots 75 does not interfere or engage the outer loop member 76. The outer loop member 76 preferably serves as an attachment point for a retaining strap 66 between the side supports 70 and the side openings 13 of the spine board 12.

In an embodiment, each side support 70 may be further secured to the spine board 12 with a retaining strap 66 as illustrated in FIG. 9 with assists in preventing the present invention from falling off of the spine board 12 and the side supports 70 pivoting outwardly toward an open position. The retaining strap 66 preferably includes an end hook 67 upon each end of the retaining strap 66 and a buckle 68 to tighten the retaining strap 66 and may also include a swivel 69 to allow the retaining strap 66 to rotate to prevent binding of the retaining strap 66. The side supports 70 and the cross member 22 also define a cavity 79 to receive an end of the spine board 12.

ii. Strap

The strap 62 is comprised of an elongated configuration to efficiently wrap around an outer diameter of the spine board 12 and the side supports 70 as illustrated in FIGS. 1 through 3. The strap 62 is further comprised of a strong and flexible strap 62. The strap 62 secures the side supports 70 tight against the sides of the spine board 12 and thus secures the front support 20 upon the end of the spine board 12, wherein the front support 20 is attached to the side supports 70. The strap 62 wraps around the board 12 and over the outer side of the side supports 70 and then is secured upon itself via a buckle 63 (e.g. over center buckle) or various other structures utilized to secure straps 62 upon objects. It is appreciated, the strap 62 may extend through the slots 75 of the side supports 70 when wrapping the strap 62 around the spine board 12.

F. Operation of Present Invention

As illustrated in the embodiment of FIG. 1, the strap 62 is first loosened and the side supports 70 are angled in a manner to conform to the sides of the spine board 12 adjacent the end of the spine board 12 that the present invention is to be attached to. The present invention is then positioned upon the end of the spine board 12 ensuring the retaining portions 32, 42 of the foot rest assembly 40 and outer supports 30 are positioned upon the end of the spine board 12. The outer supports 30 may need to be slidably adjusted so the side supports 70 are positioned tight against each of the sides of the spine board 12. The strap 62 is now ensured to be properly wrapped around the spine board 12 and through the loop member 72 of the side support(s) 70. The strap 62 is now tightened and the buckle 63 fastener thus securing the present invention to the spine board 12.

Figure 13:
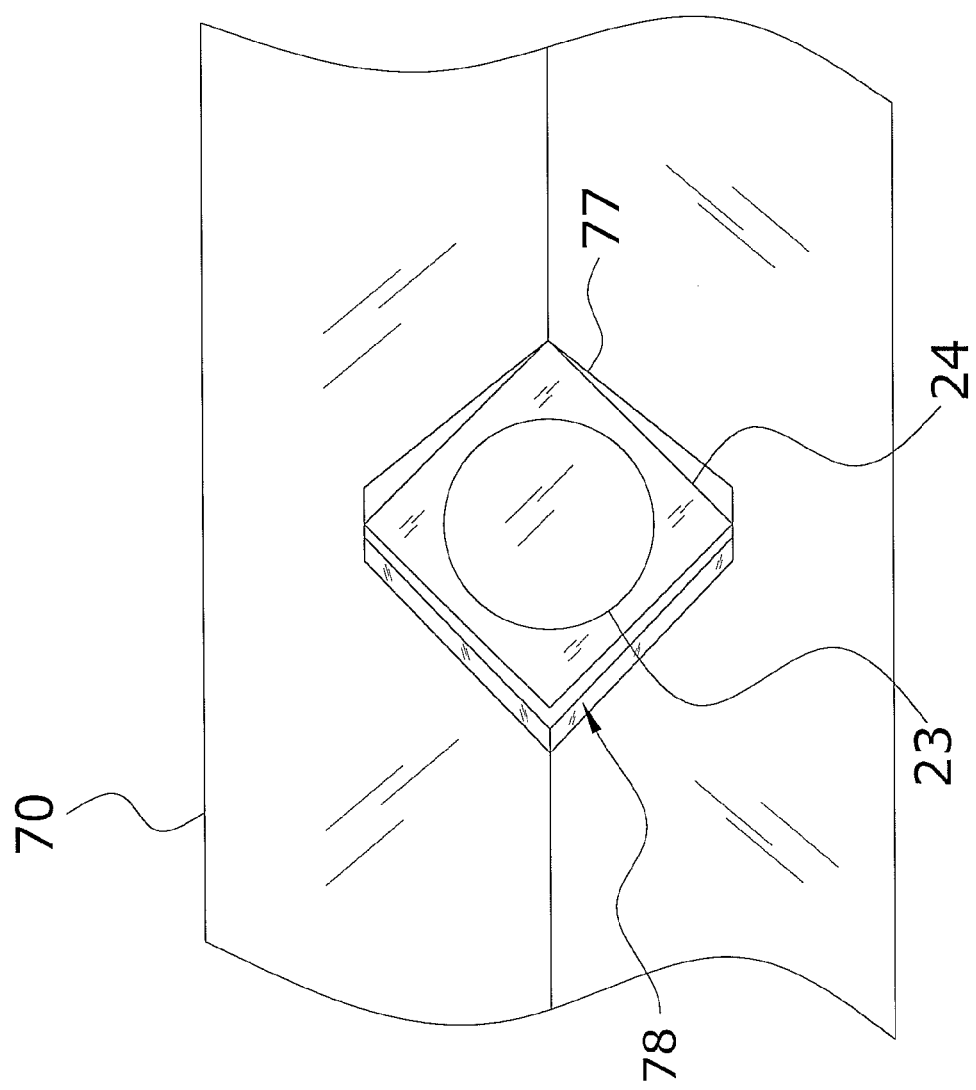
FIG. 13 is a side view illustrating the space between the perimeter of the front support and the inner receiver opening of the side supports to allow the side supports to pivot when positioned over the front support.

As illustrated in FIGS. 8 through 12, the side supports 70 are pivoted outwards via the slight amount of "play" (i.e. space 78) between the inner receiver opening 77 and the sleeve member 24 surrounding the cross member 22 as illustrated in FIG. 13. The strap 62 may also be loosely strung through the slots 75 of the side supports 70. The spine board 12 is now slid within the rectangular shaped cavity 79 formed between the side supports 70 and through the loop formed by the strap 62. Once the spine board 12 is positioned firmly against the footrest 45 or the foot rest assembly 40 and within the cavity 79, the side supports 70 may be pivoted inwardly toward and against the spine board 12. The strap 62 may then be cinched tightly thus tightening the side supports 70 further against the spine board 12. A pair of retaining straps 66 may then be secured within the side openings 13 of the spine board 12 and the outer loop member 76 of the side supports 70 and tightened accordingly.

When utilizing the present invention the wheels 56 are able to freely roll, wherein an operator would push or pull the opposing end of the spine board 12 than the present invention is attached. When pulling or pushing the spine board 12 and attached present invention down the stairs 19, the wheels 56 and the wheel mount 51 freely rotate thus allowing the spine board 12 to crawl down or up the stairs 19 in a smooth manner.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A wheeled attachment system, comprising:
   a front support;
   a pair of wheel assemblies extending from opposing sides of said front support;
   a pair of extension members interconnecting said pair of wheel assemblies with said front support so that a center rotational axis of said pair of wheel assemblies is vertically offset with said front support;
   a pair of side supports laterally extending from said front support;

wherein said pair of side supports and said front support define a cavity adapted to securely receive an end of a spine board; and at least one strap extending from said pair of side supports, wherein said at least one strap is adapted to secure said pair of wheel assemblies about said spine board.

2. The wheeled attachment system of claim 1, wherein said pair of wheel assemblies extend inwardly from said pair of extension members.

3. The wheeled attachment system of claim 2, wherein said pair of wheel assemblies are positioned underneath said front support.

4. The wheeled attachment system of claim 1, wherein said pair of wheel assemblies extend outwardly from said pair of extension members.

5. The wheeled attachment system of claim 1, wherein said pair of extension members are comprised of a U-shaped cross-sectional configuration.

6. The wheeled attachment system of claim 1, including a footrest assembly extending from said front support.

7. The wheeled attachment system of claim 6, wherein said footrest assembly includes a retaining portion comprised of a sideways V-shaped configuration.

8. The wheeled attachment system of claim 7, wherein said footrest assembly includes a riser extending angularly upward from a lower part of said retaining portion.

9. The wheeled attachment system of claim 1, wherein said pair of extension members each include an upper connecting element to connect to said front support and a lower connecting element to connect to said pair of wheel assemblies.

10. The wheeled attachment system of claim 9, wherein said upper connecting element and said lower connecting element extend in a similar direction from a respective said extension member.

11. The wheeled attachment system of claim 9, wherein said upper connecting element and said lower connecting element extend in an opposite direction from a respective said extension member.

12. The wheeled attachment system of claim 1, wherein said pair of side supports are movably attached to said front support.

13. The wheeled attachment system of claim 1, including a footrest assembly extending from said front support, wherein said footrest assembly includes a handlebar.

14. The wheeled attachment system of claim 1, including a footrest assembly slidably connected to said front support.

15. The wheeled attachment system of claim 1, wherein said pair of wheel assemblies are comprised of tri-wheeled assemblies.

16. A wheeled attachment system, comprising:
a front support;
a footrest assembly extending from said front support;
wherein said footrest assembly includes a handlebar;
a pair of tri-wheeled assemblies extending from opposing ends of said front support;
a pair of extension members interconnecting said pair of tri-wheeled assemblies with said front support so that a center rotational axis of said pair of tri-wheeled assemblies is vertically offset with said front support;
a pair of side supports laterally extending from said front support;
wherein said pair of side supports and said front support define a cavity adapted to securely receive an end of a spine board; and
at least one strap extending from said pair of side supports, wherein said at least one strap is adapted to secure said pair of wheel assemblies about said spine board.

17. The wheeled attachment system of claim 16, wherein said pair of tri-wheeled assemblies extend inwardly from said pair of extension members.

18. The wheeled attachment system of claim 17, wherein said pair of tri-wheeled assemblies are positioned underneath said front support.

19. The wheeled attachment system of claim 16, wherein said pair of tri-wheeled assemblies extend outwardly from said pair of extension members.

20. A wheeled attachment system, comprising:
a spine board;
a front support;
a footrest assembly extending from said front support;
wherein said footrest assembly includes a handlebar;
wherein said footrest assembly includes a retaining portion comprised of a sideways V-shaped configuration;
wherein said footrest assembly includes a riser extending angularly upward from a lower part of said retaining portion;
a pair of tri-wheeled assemblies extending from opposing sides of said front support;
a pair of extension members interconnecting said pair of tri-wheeled assemblies with said front support so that a center rotational axis of said pair of tri-wheeled assemblies is vertically offset with said front support;
a pair of side supports laterally extending from said front support;
wherein said pair of side supports are movably attached to said front support;
wherein said pair of side supports and said front support define a cavity adapted to securely receive an end of said spine board; and
at least one strap extending from said pair of side supports, wherein said at least one strap is adapted to secure said pair of wheel assemblies about said spine board;
wherein said pair of extension members each include an upper connecting element to connect to said front support and a lower connecting element to connect to said pair of wheel assemblies.

* * * * *